Aug. 13, 1957     C. J. THELANDER     2,802,327
ROTARY LAWN MOWER DISCHARGE GUARD
Filed May 3, 1955
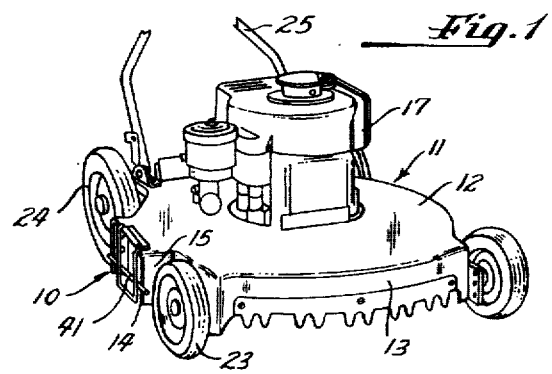
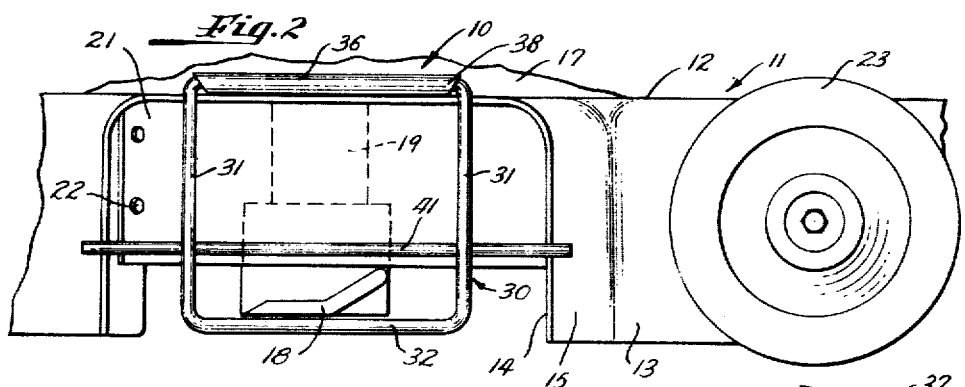
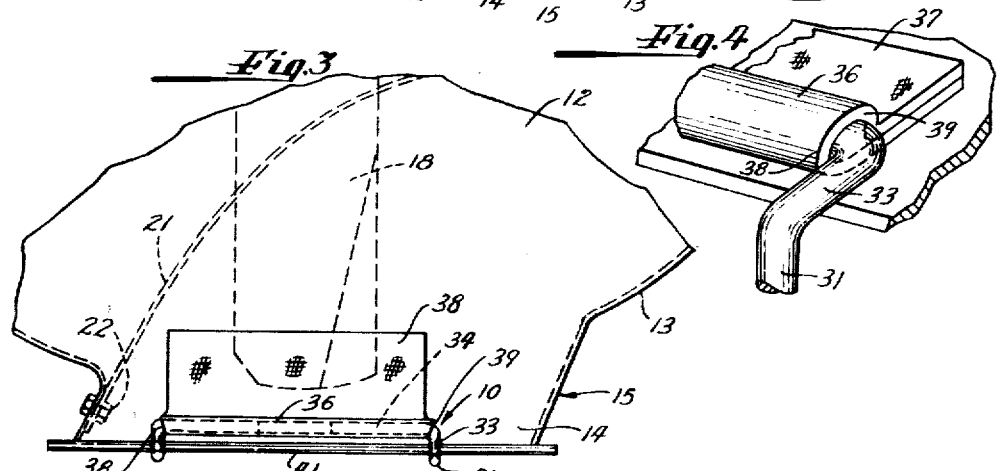
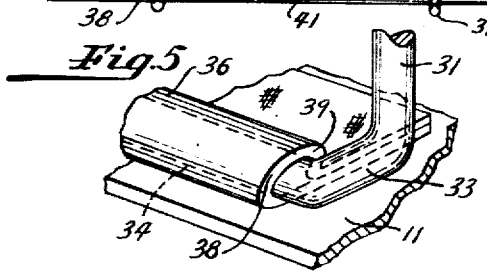
Inventor
Clement J. Thelander
By McCanna and Morsbach
Attys.

United States Patent Office 2,802,327
Patented Aug. 13, 1957

2,802,327

ROTARY LAWN MOWER DISCHARGE GUARD

Clement J. Thelander, Sterling, Ill., assignor to Buffalo Eclipse Corporation, North Tonawanda, N. Y., a corporation of New York Application May 3, 1955, Serial No. 505,695

4 Claims. (Cl. 56—25.4)

This invention relates to lawn mowers and more particularly to a rotary type lawn mower.

In the rotary type lawn mowers, there is generally provided a housing which encloses the rotating blade at the top and at the periphery thereof to protectively enclose the blade and also provide a mounting for the motor, wheels and handle. In order to prevent clogging of the housing with clippings, a discharge opening is generally provided in the housing to discharge the clippings therefrom out of the path of advance of the mower. The blade extends at its ends into closely spaced adjacency to the walls of the housing and, since the length of the discharge chute on the housing is usually made short to permit close trimming with the mower, injuries have occurred to the operator due to the extending of a portion of the body such as the foot of the operator into the discharge opening. This occurs most frequently when starting the motor at which time the operator stands at one side of the mower to operate the starter.

An important object of this invention is the provision of a rotary lawn mower having an improved guard for the discharge chute, which guard is arranged so as to not materially impede the discharge of cuttings from the mower during normal operation.

Another object of this invention is the provision of an improved guard for the discharge opening in a rotary mower which is swingable out of position overlying the discharge opening to permit complete uncovering of the opening when necessary.

Yet another object of this invention is the provision of an improved mounting for the guard which is arranged to yieldably maintain the guard in either its lowered position overlying the discharge opening or in a raised position uncovering the discharge opening for cutting heavy growths.

These, together with various ancillary objects and advantages of this invention will be more readily appreciated as the same becomes better understood by reference to the following detailed description when taken in connection with the accompanying drawings wherein:

Fig. 1 is a perspective view of the mower having the guard of the present invention mounted thereon;

Fig. 2 is an enlarged fragmentary side elevational view of the mower showing the guard overlying the discharge opening;

Fig. 3 is an enlarged fragmentary top plan view of the mower and guard;

Fig. 4 is an enlarged fragmentary perspective view of the mounting for the guard, and showing the latter in its lowered position; and Fig. 5 is an enlarged fragmentary perspective view of the mounting for the guard showing the latter in its raised position.

The guard 10 of the present invention is generally applicable for use in rotary mowers of the type in which the housing 11 has a top wall 12 overlying the top of the blade, a depending side wall 13 extending around the periphery of the blade and a discharge opening 14 located in the side wall to permit the discharge of cuttings from the housing. In the embodiment illustrated in the drawings, the discharge opening 14 is located at one side of the housing, it being apparent that the discharge opening may be otherwise located, as at the rear of the housing, if desired. The side wall 13 of the housing is bent outwardly at opposite ends of the top of the discharge opening and the top wall 12 is extended over the top of the discharge opening to form a laterally extending discharge chute 15 which extends a short distance outwardly from the periphery of the blade and which is open at the bottom thereof to provide a normally unobstructed passage for the clippings. A motor 17 is mounted on the top wall of the housing and has a horizontally rotatable blade 18 attached to its vertically disposed drive shaft 19. The blade, at its ends, extends into closely spaced adjacency to the side wall of the housing and rotates in a plane located adjacent the lower edge of the side wall. As is best shown in Fig. 2, a curved baffle plate 21 is attached, as by fasteners 22, to the side wall 13 of the housing adjacent one side of the discharge opening 14 and extends into the housing at the underside of the top wall to guide the cuttings from the housing through the discharge opening. The lower edge of the baffle plate is spaced above the lower edge of the housing and the blade 18 is mounted to underlie the baffle plate during rotation of the latter. Forward and rear ground engaging wheels 23 and 24 are mounted on the housing and extend below the lower edge of the side wall a distance sufficient to provide clearance between the ground and the housing, and a handle 25 is mounted on the housing to permit guiding of the mower.

The guard 10 is arranged to overlie the discharge opening 14 to prevent the operator from inadvertently extending his foot or other portion of his body into the opening where it would be injured by engagement with the blade 18. The guard is advantageously formed of wire and includes an open framework 30 which extends across the central portion of the discharge opening adjacent the lower end thereof. A pair of spaced members 31 extend upwardly from the framework and provision is made for swingably attaching these members to the housing to permit the framework to be moved into and out of position overlying the discharge opening. In the form of the invention illustrated, the framework 30 includes a horizontally disposed portion 32 on the lower ends of the members 31 extending across the discharge opening closely adjacent the lower edge of the side walls when the guard is positioned to overlie the opening.

A cross piece 41 is attached to the members 31, as by welding, above the horizontally disposed portion 32, preferably at a position just above the blade 18 and adjacent the lower end of the baffle 21. The cross piece also extends across the discharge opening and, conveniently, is arranged to engage the housing at opposite ends of the discharge opening to limit inward swinging movement of the guard.

The upper ends of the members 31 are laterally offset, as indicated at 33, to overlie the top wall of the housing and have inwardly extending arms 34 formed on the ends thereof. The inwardly extending arms 34 are rotatably journalled on the mower housing to support the guard for vertically swinging movement thereon, and for this purpose a hinge knuckle 36 is attached to the top wall of the housing to rotatably receive the inwardly extending arms. Conveniently, the knuckle may be formed of a single piece of sheet stock bent upon itself to form the knuckle 36 and an attaching portion 37 which is secured, as by welding, to the top wall of the housing.

In accordance with the present invention, the knuckle 36 has a length substantially equal to the spacing between the offset portions 33 on the guard and has cam surfaces 38 formed on the ends thereof arranged to engage the offset portions of the guard to yieldably retain the guard in either its lowered position overlying the discharge opening, or in a raised position in which the offset portions 33 rest upon the top wall of the housing, as best shown in Fig. 5. As is apparent from Figs. 2 and 3, the cam surface 38 is formed with a lobe or high point 39 engageable with the offset portions 33, as the guard is moved from its lowered position shown in Fig. 4 to its raised position shown in Fig. 5, which lobe tends to spread the side portions 31 of the guard apart. In this manner, the guard is yieldably retained in either its lowered position or its raised position, and is manually swingable between these positions.

From the foregoing it is apparent that the guard construction of the present invention will protectively cover the tip of the blade to prevent injuries to the operator in such a manner as to not materially impede the egress of the cuttings from the discharge openings. In this regard it is to be noted that the portion 32 and the cross piece 41 extend across the discharge opening above and below the cutting blade so that the framework formed thereby protectively covers the tip of the blade without blocking the upper portion of the discharge opening. In normal operation, the rising current of air produced by the cutter blade raises the grass cuttings in the housing so that they are blown out the upper portion of the discharge opening above the framework. In cutting heavy growths, however, the grass tends to fill the housing. Under these conditions, the guard 10 may be swung to a position completely uncovering the opening. The hinge construction for swingably mounting the guard on the housing is arranged to yieldably retain the guard in either its lowered position overlying the discharge opening or in its raised position uncovering the discharge opening.

I claim:

1. In a rotary lawn mower, the combination of a horizontally rotatable blade, a motor for driving said blade, a housing including a top overlying said blade and sides extending around the periphery of the blade and having a discharge opening therein, a guard for said opening mounted for vertical swinging movement on said housing, said guard comprising an open framework including a horizontally disposed member extending across at least the central portion of the discharge opening at the lower edge of the housing, a pair of attaching members on said horizontally disposed member extending upwardly therefrom, a cross bar secured to said upwardly extending members above the horizontally disposed member and extending completely across said opening to engage the sides of the housing at opposite edges of the discharge opening therein to limit swinging movement of said guard into said opening, and means for mounting the upper ends of said attaching members on said housing for vertical swinging movement.

2. In a rotary lawn mower, the combination of a horizontally rotatable blade, a motor for driving said blade, a housing having a top wall overlying said blade and a depending side wall extending downwardly around the periphery of the table to adjacent the lower edge of the blade, said side wall having a discharge opening therein open at the bottom, a guard for said opening comprising an open wire framework having spaced wire portions extending across said opening above and below said blade, at least one of said portions extending completely across said opening and into engagement with said side wall at opposite sides of the opening therein to limit inward movement of said guard into said opening, attaching portions extending upwardly from said framework, offset portions on the ends of each of the attaching portions of said member extending in a direction transverse the plane of said framework, inwardly extending arms on said offset portions, and means pivotally attaching said arms on the top of said housing inwardly of said opening therein to support said guard on the housing for vertical swinging movement from a position overlying said opening to a raised position in which the guard extends upwardly from the opening with said offset portions resting on the top of the housing to support the guard in its raised position.

3. The combination of claim 2 wherein said means for attaching the arms includes a hinge plate having a knuckle thereon for rotatably receiving one of said inwardly extending arms, and a cam surface on the end of said knuckle having a lobe engageable with one of said offset portions for releasably retaining said guard in its lowered and in its raised positions.

4. In a rotary lawn mower, the combination of a horizontally rotatable blade, a motor for driving said blade, a housing enclosing said blade at the top and sides thereof and having a discharge opening located adjacent the periphery of the blade, a guard for said opening comprising a U-shaped member having spaced side portions and a connecting web portion, inwardly extending arms on the ends of said side portions, a hinge plate mounted on said housing and having a knuckle rotatably receiving one of said arms to support the U-shaped member for vertical swinging movement from a position overlying said opening to a raised position uncovering said opening, a cam surface formed on the end of said knuckle engageable with a side portion on said U-shaped member, said cam surface having a lobe arranged to spread the side portion of said U-shaped member apart as the guard is moved from a lowered position overlying said opening to a position intermediate said lowered and raised position and to permit said legs to move towards each other as the guard is moved from the intermediate position to its raised position whereby to yieldably retain said guard in either its lowered or its raised position.

References Cited in the file of this patent

UNITED STATES PATENTS

| | | |
|---|---|---|
| 1,355,332 | Hanson | Oct. 12, 1920 |
| 2,514,407 | May | July 11, 1950 |
| 2,669,826 | Watrous | Feb. 23, 1954 |
| 2,708,334 | Coners | May 17, 1955 |

UNITED STATES PATENT OFFICE

CERTIFICATE OF CORRECTION

Patent No. 2,802,327                                          August 13, 1957

Clement J. Thelander

It is hereby certified that error appears in the printed specification of the above numbered patent requiring correction and that the said Letters Patent should read as corrected below.

Column 4, line 1, for "table" read -- blade --.

Signed and sealed this 8th day of October 1957.

(SEAL)
Attest:
KARL H. AXLINE
Attesting Officer

ROBERT C. WATSON
                                                           Commissioner of Patents